(12) United States Patent
Lee

(10) Patent No.: US 8,664,793 B2
(45) Date of Patent: Mar. 4, 2014

(54) ON-DEMAND GENERATION OF ELECTRICITY FROM STORED WIND ENERGY

(75) Inventor: Jean L. Lee, San Jose, CA (US)

(73) Assignee: Apple Inc., Cupertino, CA (US)

( * ) Notice: Subject to any disclaimer, the term of this patent is extended or adjusted under 35 U.S.C. 154(b) by 301 days.

(21) Appl. No.: 13/167,255

(22) Filed: Jun. 23, 2011

(65) Prior Publication Data

US 2012/0326445 A1 Dec. 27, 2012

(51) Int. Cl.
*F03D 9/00* (2006.01)
*H02P 9/04* (2006.01)

(52) U.S. Cl.
USPC .......................................................... 290/55

(58) Field of Classification Search
USPC ..................................................... 290/44, 55
See application file for complete search history.

(56) References Cited

U.S. PATENT DOCUMENTS

| 5,384,489 A | 1/1995 | Bellac |
| 2007/0220889 A1 | 9/2007 | Nayef |
| 2009/0021012 A1 | 1/2009 | Stull |
| 2012/0001436 A1 * | 1/2012 | Sami et al. ...................... 290/55 |

FOREIGN PATENT DOCUMENTS

EP  2236822 A1  10/2010

* cited by examiner

*Primary Examiner* — Javaid Nasri
(74) *Attorney, Agent, or Firm* — Park, Vaughan, Fleming & Dowler LLP; Chia-Hsin Suen

(57) ABSTRACT

The disclosed embodiments provide a system that generates electricity. During operation, the system uses a set of rotating blades to convert rotational energy from a wind turbine into heat in a low-heat-capacity fluid. Next, the system selectively transfers the heat from the low-heat-capacity fluid to a working fluid. Finally, the system uses the transferred heat in the working fluid to generate electricity.

15 Claims, 3 Drawing Sheets

ON-DEMAND GENERATION OF ELECTRICITY FROM STORED WIND ENERGY

BACKGROUND

1. Field

The present embodiments relate to wind energy. More specifically, the present embodiments relate to techniques for storing rotational energy from a wind turbine as heat and using the stored heat to subsequently generate electricity on demand.

2. Related Art

Wind energy technology is typically used to convert kinetic energy from wind into mechanical energy and/or electricity. To harness wind power, a wind turbine may include a set of blades and a rotor shaft connected to the blades. Wind blowing over the blades may cause the blades to turn and the rotor shaft to rotate. In addition, the rotating rotor shaft may be coupled to a mechanical system that performs tasks such as grinding grain and/or pumping water. Alternatively, the rotor shaft may be connected to an electric generator that converts the rotational energy into electricity, which may subsequently be used to power a motor vehicle, home, business, and/or electrical grid.

However, the variable nature of wind may interfere with on-demand generation of electricity from wind energy. For example, fluctuations in wind speed may hamper the adequate production of electricity from wind power during periods of peak demand, or conversely, may produce excess electrical power during periods of low demand. In turn, such variability may limit the ability to incorporate large amounts of wind power into a grid system. For example, other power stations (e.g., coal, natural gas, hydroelectric, nuclear) may be required to offset variations in electricity generated from wind power and maintain reliable electric service in an electrical grid.

Hence, what is needed is a mechanism for mitigating variability and/or intermittency associated with the production of electricity from wind energy.

SUMMARY

The disclosed embodiments provide a system that generates electricity. During operation, the system uses a set of rotating blades to convert rotational energy from a wind turbine into heat in a low-heat-capacity fluid. Next, the system selectively transfers the heat from the low-heat-capacity fluid to a working fluid. Finally, the system uses the transferred heat in the working fluid to generate electricity.

In some embodiments, the system also uses an insulated vessel to retain the heat in the low-heat-capacity fluid.

In some embodiments, converting rotational energy from the wind turbine into heat in the low-heat-capacity fluid involves operatively connecting a rotor shaft of the wind turbine to the rotating blades, and immersing the rotating blades in the low-heat-capacity fluid. Friction between the rotating blades and the low-heat-capacity fluid is then used to increase a temperature of the low-heat-capacity fluid.

In some embodiments, the rotor shaft is operatively connected to the rotating blades using at least one of a driveshaft, a chain, a belt, and a set of gears.

In some embodiments, selectively transferring the heat from the low-heat-capacity fluid to the working fluid involves disposing a thermally insulating component between the low-heat-capacity fluid and the working fluid to retain the heat in the low-heat-capacity fluid, and repositioning the thermally insulating component to transfer the heat from the low-heat-capacity fluid to the working fluid through a thermally conductive component.

In some embodiments, the thermally conductive component is component having high thermal conductivity, such as a metal surface, a manifold, a conductive rod, and a radiator.

In some embodiments, selectively transferring the heat from the low-capacity fluid to the working fluid involves transferring the heat from the low-capacity fluid to the working fluid based on electrical demand associated with the wind turbine.

In some embodiments, the transferred heat boils the working fluid. Electricity may then be generated by using vapor from the boiled working fluid to rotate a turbine, and using the turbine to drive an electric generator.

In some embodiments, the working fluid is associated with a low boiling point.

In some embodiments, the rotating blades include at least one of a propeller, an impeller, one or more paddles, and a drum.

In some embodiments, the low-heat-capacity fluid is at least one of an inert gas, nitrogen, ethanol, or mercury.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
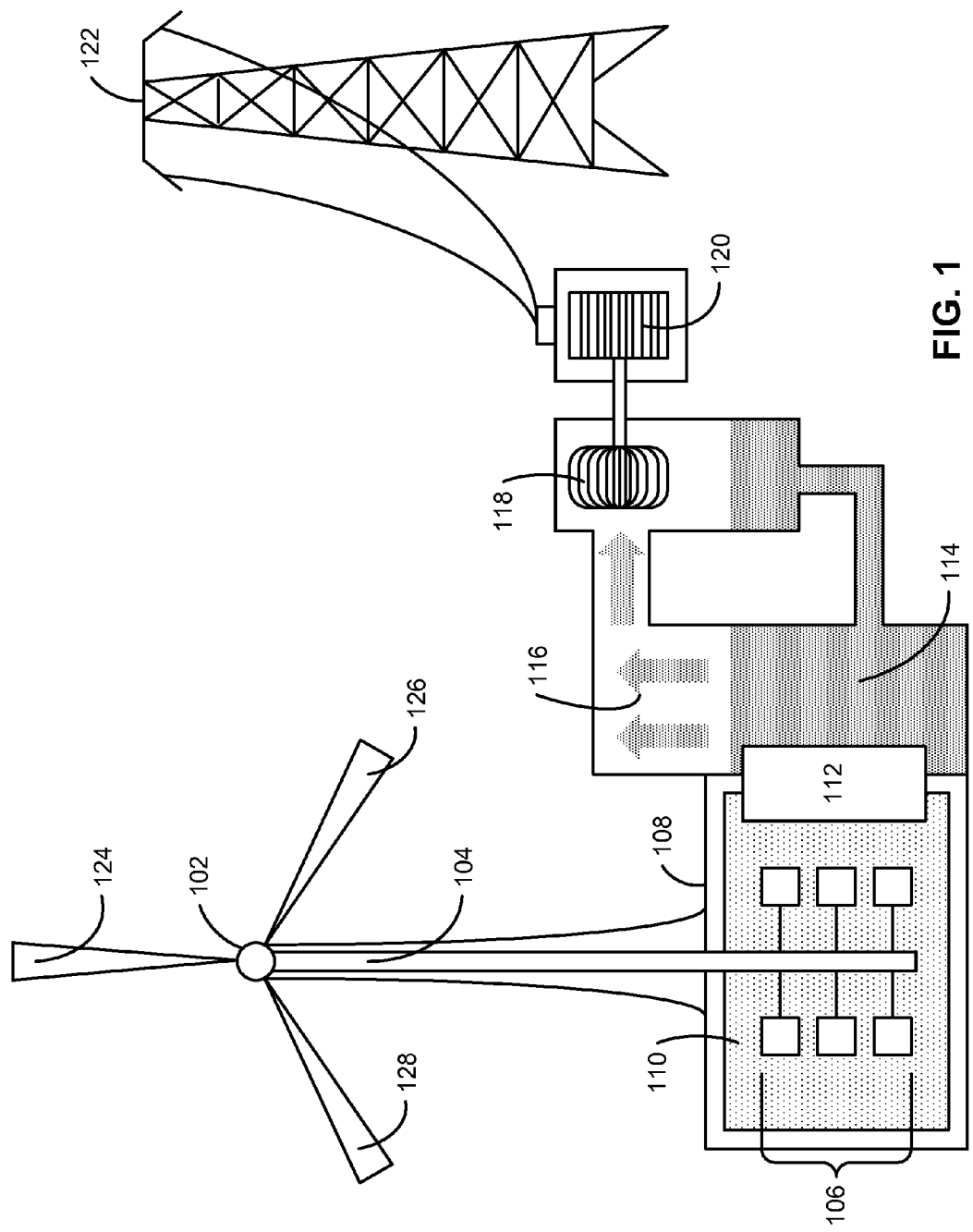
FIG. 1 shows a schematic of a system in accordance with an embodiment.

The disclosed embodiments provide a method and system for generating electricity from wind power. As shown in FIG. 1, the wind power may be collected by a wind turbine that includes a rotor shaft 102 connected to a set of blades 124-128. Wind blowing over blades 124-128 may cause blades 124-128 to turn and rotor shaft 102 to rotate. Rotational energy from rotor shaft 102 may then be converted into electricity using an electric generator connected to rotor shaft 102 (e.g., within a nacelle of the wind turbine).

However, electrical output of the wind turbine may fluctuate from inherent variations in wind speeds. Furthermore, such fluctuations may prevent the wind turbine from balancing electricity generation with electric demand (e.g., from an electrical grid 122). As a result, the wind turbine may incur costs associated with operating and/or shutting down electric generators powered by other forms of energy (e.g., coal, natural gas, hydroelectric power, nuclear power) in response to changes in electric demand and/or fluctuations in the supply of wind power.

To reduce such costs and/or increase the reliability of wind power, the system of FIG. 1 may store energy from the wind turbine and subsequently generate electricity from the stored energy based on electric demand. First, the energy may be stored in a low-heat-capacity fluid 110. One end of a rotation-transmission mechanism 104 may be operatively connected to rotor shaft 102, and another end of rotation-transmission mechanism 104 may be operatively connected to a set of rotating blades 106 immersed in low-heat-capacity fluid 110. For example, rotation-transmission mechanism 104 may include a driveshaft, chain, belt, and/or other mechanism for transmitting rotational energy from blades 124-128 and/or rotor shaft 102 to blades 106. Rotation-transmission mechanism 104 may also include a set of gears that increase or decrease the rotational speed and/or torque of blades 106 relative to those of rotor shaft 102.

The rotational energy may then be converted into heat in low-heat-capacity fluid 110 as friction between blades 106 and low-heat-capacity fluid 110 causes an increase in the temperature of low-heat-capacity fluid 110. For example, blades 106 may include an impeller, one or more paddles, a propeller, a drum, and/or another component having high surface area normal to the direction of rotation used to agitate, circulate, and/or heat low-heat-capacity fluid 110. Along the same lines, low-heat-capacity fluid 110 may correspond to an inert gas (e.g., argon, neon, etc.), nitrogen, ethanol, mercury, and/or other gas or liquid that heats quickly in response to friction and/or agitation caused by the rotation of blades 106.

Low-heat-capacity fluid 110 may additionally be placed into an insulated vessel 108 to retain the heat in low-heat-capacity fluid 110. In other words, rotation-transmission mechanism 104, blades 106, low-heat-capacity fluid 110, and/or insulated vessel 108 may be used to obtain and store energy from the wind turbine. The stored energy may then be used to generate electricity based on electrical demand associated with the wind turbine. For example, heat may be generated and/or stored in low-heat-capacity fluid 110 during periods of high wind and/or low electrical demand and converted into electricity during periods of low wind and/or high electrical demand.

To generate electricity from the stored energy, a heat-transfer mechanism 112 may selectively transfer heat from low-heat-capacity fluid 110 to a working fluid 114 with a low boiling point, such as propane, chloromethane, butane, and/or neo-pentane. As discussed in further detail below with respect to FIG. 2, heat-transfer mechanism 112 may include a thermally conductive component and a thermally insulating component. The thermally insulating component may be disposed between low-heat-capacity fluid 110 and working fluid 114 to retain heat (e.g., store energy) in low-heat-capacity fluid 110. On the other hand, the thermally insulating component may be repositioned to transfer the heat from low-heat-capacity fluid 110 to working fluid 114 through the thermally conductive component.

Once sufficient heat is transferred to working fluid 114, the heat may be used to generate electricity. In particular, the heat may boil working fluid 114 (e.g., due to the low boiling point of working fluid 114), generating vapor 116 that is used to rotate a turbine 118. Turbine 118 may then be used to drive an electric generator 120 that supplies electricity to a load, such as a motor vehicle, home, business, building, and/or electrical grid 122. Transfer of heat from low-heat-capacity fluid 110 to working fluid 114, as well as the resulting generation of electricity from the transferred heat, may be ceased once the energy stored in low-heat-capacity fluid 110 is no longer needed to meet electrical demand.

Variability and/or intermittency associated with wind power may thus be mitigated by storing energy from the wind turbine in low-heat-capacity fluid 110 and using the stored energy in subsequent on-demand production of electricity. As mentioned above, such on-demand electricity generation may be enabled by using rotational energy from the wind turbine to heat low-heat-capacity fluid 110 during periods of high wind and/or low demand, and using the heat to power electric generator 120 (e.g., via working fluid 114, vapor 116, and turbine 118) during periods of low wind and/or high demand.

Such on-demand generation of electricity from stored wind energy may additionally reduce costs associated with the operation of other power stations to offset fluctuations in electricity generation from wind power. Along the same lines, the use of mechanical elements (e.g., rotation-transmission mechanism 104, blades 106), low-heat-capacity fluid 110, and friction to store the energy may provide cost savings over conventional energy storage mechanisms such as batteries and/or pumped-storage hydroelectricity. In other words, the system of FIG. 1 may facilitate the effective, economical, and/or reliable generation of electricity from wind power.

Figure 2:
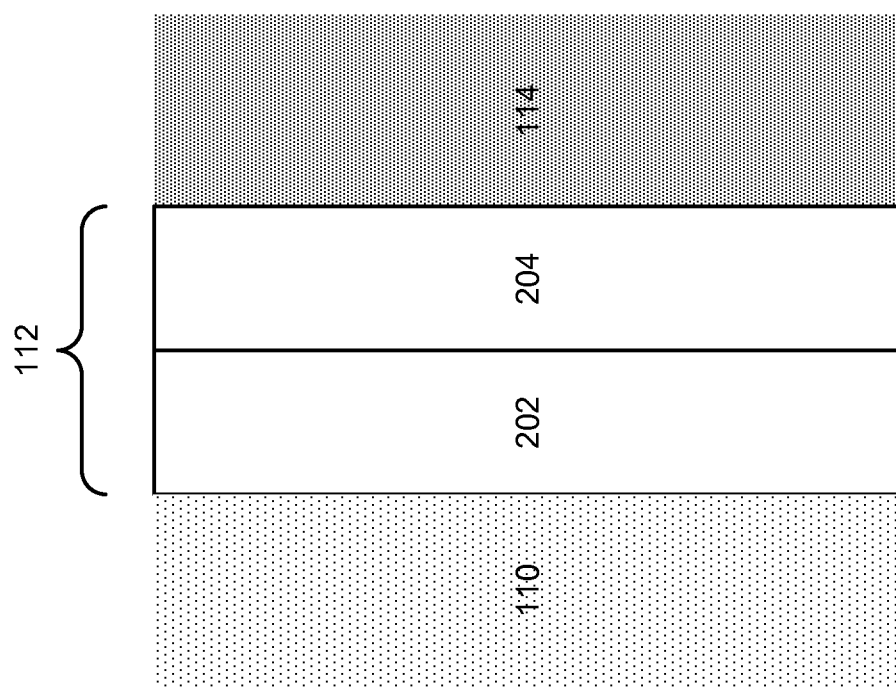
FIG. 2 shows a heat-transfer mechanism in accordance with an embodiment.

FIG. 2 shows heat-transfer mechanism 112 in accordance with an embodiment. As mentioned above, heat-transfer mechanism 112 may enable the selective transfer of heat from low-heat-capacity fluid 110 to working fluid 114. Referring to FIG. 2, heat-transfer mechanism 112 may include a thermally conductive component 204 and a thermally insulating component 202. Thermally conductive component 204 may include a metal surface, manifold, conductive rod, radiator, and/or other structure that facilitates heat transfer. Conversely, thermally insulating component 202 may include a vacuum-insulated panel and/or other thermally insulating material or structure.

To retain heat in low-heat-capacity fluid 110, thermally insulating component 202 may be disposed between low-heat-capacity fluid 110 and working fluid 114, as shown in FIG. 2. (Note that the positions of components 202 and 204 may be interchanged.) Because low-heat-capacity fluid 110 is also enclosed in an insulated vessel (e.g., insulated vessel 108 of FIG. 1), energy may be effectively stored in low-heat-capacity fluid 110 as long as thermally insulating component 202 prevents low-heat-capacity fluid 110 from thermally contacting thermally conducting component 204 and/or working fluid 114.

To transfer heat from low-heat-capacity fluid 110 to working fluid 114, thermally insulating component 202 may be repositioned to enable thermal contact between low-heat-capacity fluid 110 and working fluid 114 through thermally conducting component 204. For example, a panel and/or door corresponding to thermally insulating component 202 may be opened to expose a gold and/or other metal surface corresponding to thermally conducting component 204 to low-heat-capacity fluid 110. Once thermal contact is made between low-heat-capacity fluid 110 and thermally conducting component 204, heat may be transferred from low-heat-capacity fluid 110 to working fluid 114.

Those skilled in the art will appreciate that thermally insulating component 202 and thermally conducting component 204 may be arranged and/or positioned in multiple ways. First, thermally insulating component 202 may be disposed between low-heat-capacity fluid 110 and working fluid 114 on either side of thermally conducting component 204 to prevent thermal contact between low-heat-capacity fluid 110 and working fluid 114. Thermally insulating component 202 may also surround multiple sides of thermally conducting component 204. For example, thermally conducting component 204 may correspond to a manifold and/or radiator through which low-heat-capacity fluid 110 may flow. To retain heat in low-heat-capacity fluid 110, thermally insulating component 202 may be disposed around the exterior and/or interior of the manifold and/or radiator. To enable the transfer of heat from low-heat-capacity fluid 110 to working fluid 114, one or more portions of thermally insulating component 202 may be removed to expose some or all of the manifold and/or radiator to both low-heat-capacity fluid 110 and working fluid 114.

Figure 3:
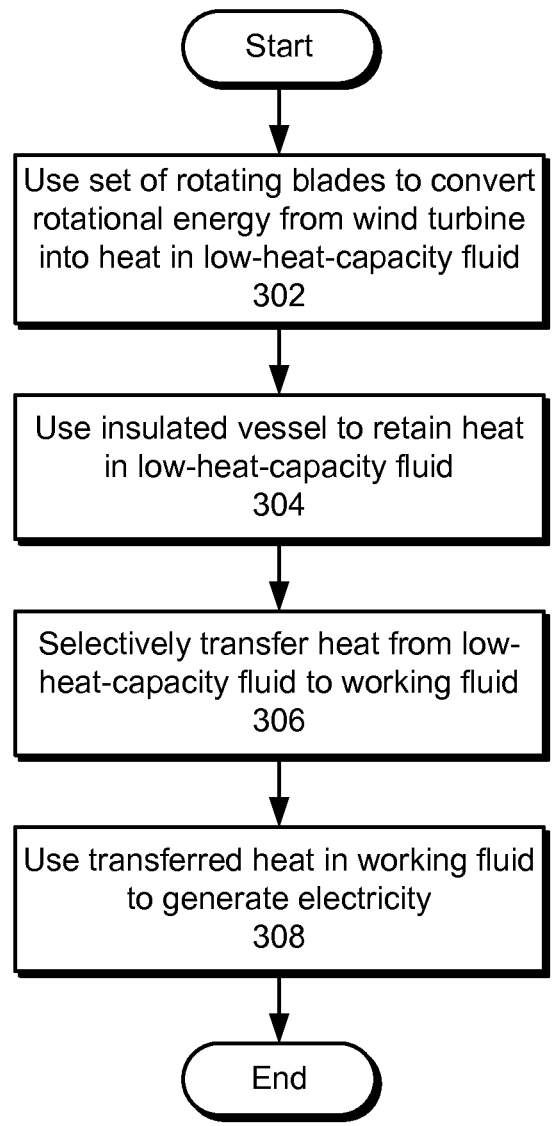
FIG. 3 shows a flowchart illustrating the process of generating electricity in accordance with an embodiment.

FIG. 3 shows a flowchart illustrating the process of generating electricity in accordance with an embodiment. In one or more embodiments, one or more of the steps may be omitted, repeated, and/or performed in a different order. Accordingly, the specific arrangement of steps shown in FIG. 3 should not be construed as limiting the scope of the embodiments.

First, a set of rotating blades is used to convert rotational energy from a wind turbine into heat in a low-heat-capacity fluid (operation 302). The rotating blades may be immersed in the low-heat-capacity fluid and include a propeller, an impeller, one or more paddles, a drum, or other similar component having high surface area normal to the direction of rotation. In addition, a rotor shaft of the wind turbine may be operatively connected to the rotating blades using a driveshaft, a chain, a belt, and/or a set of gears. As a result, friction between the rotating blades and the low-heat-capacity fluid (e.g., during turning of the rotor shaft from wind) may be used to increase a temperature of the low-heat-capacity fluid.

Next, an insulated vessel may be used to retain heat in the low-heat-capacity fluid (operation 304). The rotating blades and insulated vessel may thus facilitate the storing of energy from the wind turbine in the low-heat-capacity fluid. The stored energy may then be used to generate electricity based on electrical demand associated with the wind turbine.

To generate electricity from the stored energy, the heat from the low-heat-capacity fluid may be selectively transferred from the low-heat-capacity fluid to the working fluid (operation 306). For example, a thermally insulating component may be disposed between the low-heat-capacity fluid and the working fluid to retain the heat in the low-heat-capacity fluid. During periods of low wind and/or high electrical demand, the thermally insulating component may be repositioned to transfer the heat from the low-heat-capacity fluid to the working fluid through a thermally conductive component such as a metal surface, a manifold, a conductive rod, and/or a radiator.

Finally, the transferred heat in the working fluid is used to generate electricity (operation 308). More specifically, the working fluid may be associated with a low boiling point, such that the transfer of heat from the low-heat-capacity fluid to the working fluid quickly boils the working fluid. Vapor from the boiled working fluid may then be used to rotate a turbine, and the turbine may be used to drive an electric generator.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A system for generating electricity, comprising:
   a rotation-transmission mechanism,
      wherein a first end of the rotation-transmission mechanism is operatively connected to a rotor shaft of a wind turbine, and
      wherein a second end of the rotation-transmission mechanism is operatively connected to a set of rotating blades;
   the set of rotating blades immersed in a low-heat-capacity fluid, wherein the rotating blades are configured to convert rotational energy from the wind turbine into heat in the low-heat-capacity fluid;
   an insulated vessel containing the low-heat-capacity fluid, wherein the insulated vessel is configured to retain the heat in the low-heat-capacity fluid;
   a heat-transfer mechanism that comprises a thermally conductive component and a thermally insulating component, wherein the heat-transfer mechanism is configured to selectively transfer the heat from the low-heat-capacity fluid to a working fluid by:
      disposing the thermally insulating component between the low-heat-capacity fluid and the working fluid to retain the heat in the low-heat-capacity fluid; and
      repositioning the thermally insulating component to transfer the heat from the low-heat-capacity fluid to the working fluid through the thermally conductive component, wherein transferred heat boils the working fluid;
   a turbine configured to use vapor from the boiled working fluid to rotate; and
   an electric generator configured to use the turbine's rotation to generate electricity.

2. The system of claim 1, wherein converting rotational energy from the wind turbine into heat in the low-heat-capacity fluid involves:
   using friction between the rotating blades and the low-heat-capacity fluid to increase a temperature of the low-heat-capacity fluid.

3. The system of claim 1, wherein the rotation-transmission mechanism comprises at least one of a driveshaft, a chain, a belt, and a set of gears.

4. The system of claim 1, wherein the low-heat-capacity fluid is at least one of an inert gas, nitrogen, ethanol, or mercury.

5. The system of claim 1, wherein the thermally conductive component is at least one of a metal surface, a manifold, a conductive rod, and a radiator.

6. The system of claim 1, wherein selectively transferring the heat from the low-capacity fluid to the working fluid involves:
transferring the heat from the low-capacity fluid to the working fluid based on electrical demand associated with the wind turbine.

7. The system of claim 1, wherein the rotating blades comprise at least one of a propeller, an impeller, one or more paddles, or a drum having high surface area normal to the direction of rotation.

8. A method for generating electricity, comprising:
using a set of rotating blades to convert rotational energy from a wind turbine into heat in a low-heat-capacity fluid;
selectively transferring the heat from the low-heat-capacity fluid to a working fluid by:
disposing a thermally insulating component between the low-heat-capacity fluid and the working fluid to retain the heat in the low-heat-capacity fluid; and
repositioning said thermally insulating component to transfer the heat from the low-heat-capacity fluid to the working fluid through the thermally conductive component;
using the transferred heat to boil the working fluid;
using vapor from the boiled working fluid to rotate a turbine; and
using the turbine to drive an electric generator.

9. The method of claim 8, further comprising:
using an insulated vessel to retain the heat in the low-heat-capacity fluid.

10. The method of claim 8, wherein converting rotational energy from the wind turbine into heat in the low-heat-capacity fluid involves:
operatively connecting a rotor shaft of the wind turbine to the rotating blades; and
immersing the rotating blades in the low-heat-capacity fluid,
wherein friction between the rotating blades and the low-heat-capacity fluid is used to increase a temperature of the low-heat-capacity fluid.

11. The method of claim 10, wherein the rotor shaft is operatively connected to the rotating blades using at least one of a driveshaft, a chain, a belt, and a set of gears.

12. The method of claim 8, wherein the thermally conductive component is at least one of a metal surface, a manifold, a conductive rod, and a radiator.

13. The method of claim 8, wherein selectively transferring the heat from the low-capacity fluid to the working fluid involves:
transferring the heat from the low-capacity fluid to the working fluid based on electrical demand associated with the wind turbine.

14. The method of claim 8, wherein the working fluid is associated with a low boiling point.

15. The method of claim 8, wherein the rotating blades comprise at least one of a propeller, an impeller, one or more paddles, or a drum having high surface area normal to the direction of rotation.

* * * * *